US 11,442,883 B2

(12) United States Patent
Bito

(10) Patent No.: US 11,442,883 B2
(45) Date of Patent: Sep. 13, 2022

(54) ELECTRONIC DEVICE, DETERMINE A SETTING OF A HOST DEVICE FOR COMMUNICATION IN A SUBSEQUENT PHASE

(71) Applicant: Kioxia Corporation, Tokyo (JP)

(72) Inventor: Akinori Bito, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/120,559

(22) Filed: Dec. 14, 2020

(65) Prior Publication Data
US 2021/0390073 A1 Dec. 16, 2021

(30) Foreign Application Priority Data

Jun. 10, 2020 (JP) .............................. JP2020-101019

(51) Int. Cl.
  *G06F 13/42* (2006.01)
  *G06F 13/40* (2006.01)
  *H04L 25/03* (2006.01)
  *G06F 13/38* (2006.01)

(52) U.S. Cl.
  CPC ........ *G06F 13/4221* (2013.01); *G06F 13/387* (2013.01); *G06F 13/4059* (2013.01); *H04L 25/03343* (2013.01); *G06F 2213/0026* (2013.01)

(58) Field of Classification Search
  CPC .............. G06F 13/4221; G06F 13/387; G06F 13/4059; H04L 25/03343
  See application file for complete search history.

(56) References Cited

U.S. PATENT DOCUMENTS

| | | | | |
|---|---|---|---|---|
| 7,426,597 B1 * | 9/2008 | Tsu | ...................... | G06F 13/4018 710/307 |
| 8,599,913 B1 * | 12/2013 | Brown | ................ | G06F 13/4027 375/232 |
| 9,825,730 B1 * | 11/2017 | Berke | ................... | H04L 1/0002 |

(Continued)

FOREIGN PATENT DOCUMENTS

TW  201937381 A  9/2019

OTHER PUBLICATIONS

PCI-SIG, "PCI Express® Base Specification Revision 5.0 Version 1.0," 5.0-1.0-PUB, pcisig.com, May 22, 2019, 1299 pages.

*Primary Examiner* — Phong H Dang
(74) *Attorney, Agent, or Firm* — Oblon, McClelland, Maier & Neustadt, L.L.P.

(57) ABSTRACT

According to one embodiment, in a first state, a control circuit determines, based on first information and second information, information on a request that includes a setting of a transmission circuit of a host to be set as an initial setting in a second state. The first state is a state of communicating with a host at a first communication speed conforming to a first specification. The second state is a state of communicating with the host at a second communication speed conforming to a second specification. The second communication speed is different from the first communication speed. The first information is information on a request of a setting of the transmission circuit of the host. The second information is information on a quality of a signal received by a reception circuit, which has been transmitted from the transmission circuit of the host.

18 Claims, 4 Drawing Sheets

(56) References Cited

U.S. PATENT DOCUMENTS

| | | | |
|---|---|---|---|
| 2013/0051483 A1* | 2/2013 | Wyatt | H04L 25/03885 375/259 |
| 2014/0281067 A1* | 9/2014 | Das Sharma | H04L 25/03159 710/104 |
| 2018/0331864 A1* | 11/2018 | Das Sharma | H04L 25/03 |
| 2019/0034376 A1* | 1/2019 | Das Sharma | G11C 29/028 |
| 2020/0228375 A1* | 7/2020 | Chen | H04L 25/0278 |
| 2021/0075647 A1* | 3/2021 | Li | H04B 1/38 |

* cited by examiner

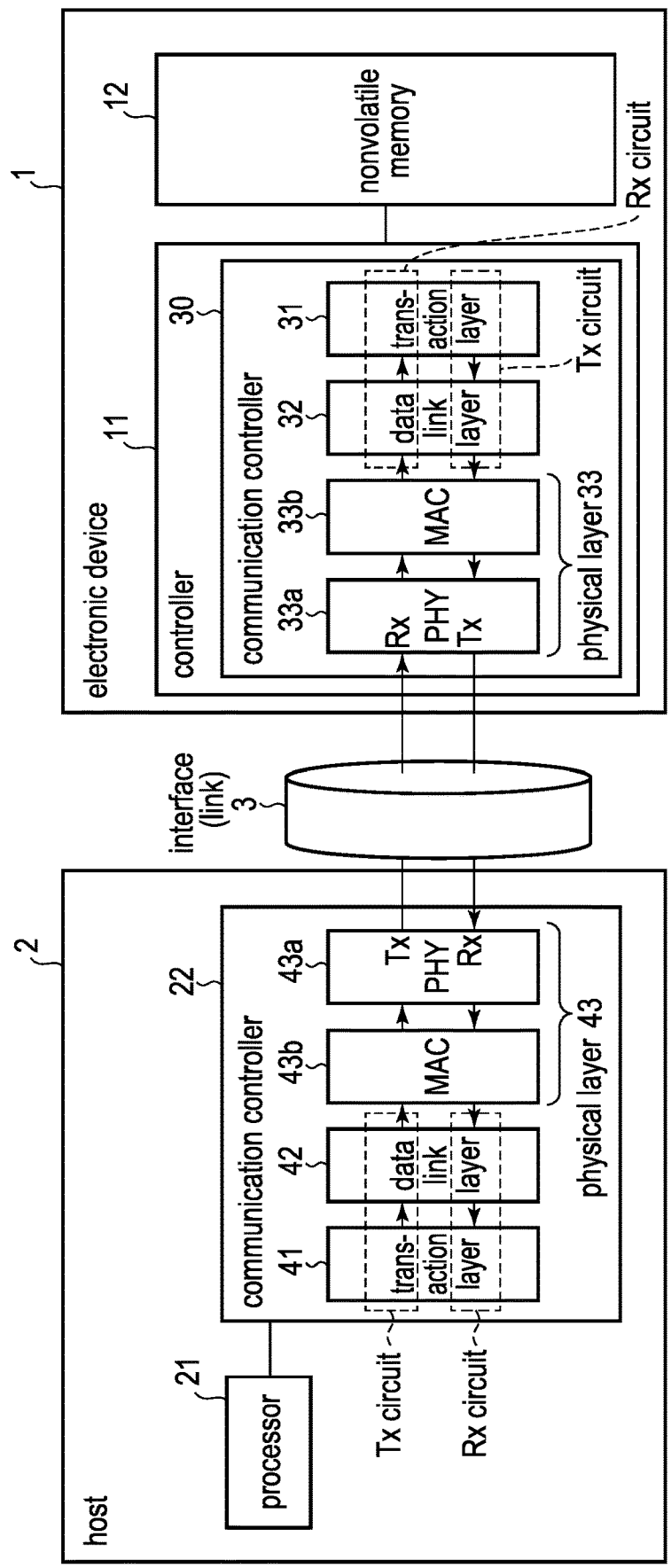
F I G. 1

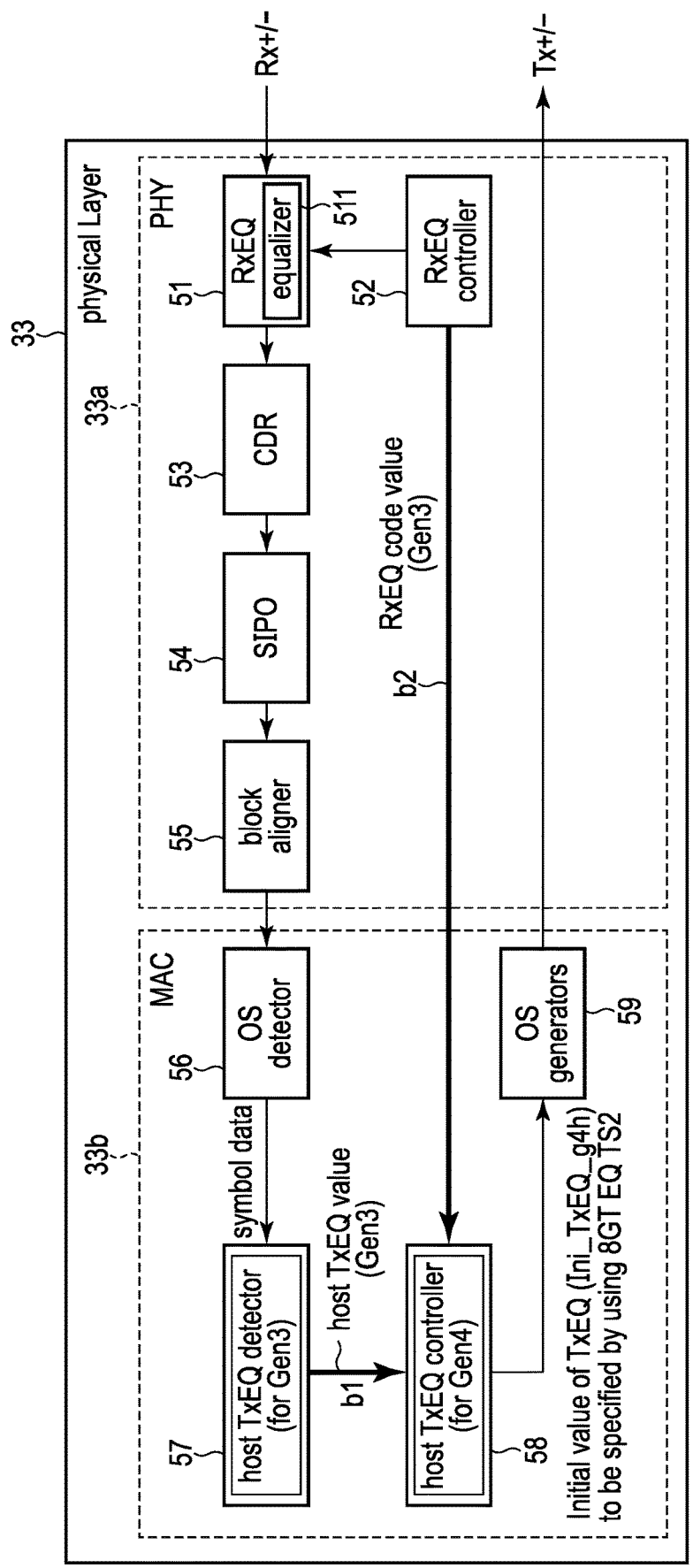
F I G. 3

ELECTRONIC DEVICE, DETERMINE A SETTING OF A HOST DEVICE FOR COMMUNICATION IN A SUBSEQUENT PHASE

CROSS-REFERENCE TO RELATED APPLICATIONS

This application is based upon and claims the benefit of priority from Japanese Patent Application No. 2020-101019, filed Jun. 10, 2020, the entire contents of which are incorporated herein by reference.

FIELD

Embodiments described herein relate generally to an electronic device, an information processing system, and a method.

BACKGROUND

In recent years, various interfaces which connect a host (host device) and a device (peripheral device) to each other, which include PCI Express (PCIe) (registered trademark), are widely used. Devices to be connected to the host by this type of interface are required to maintain a signal quality specified in the specification of the interface even if the host omits a part of the procedure referred to, for example, link equalization sequence.

BRIEF DESCRIPTION OF THE DRAWINGS

FIG. 1 is a diagram showing one configuration example of an electronic device of an embodiment connected to a host.

FIG. 3 is a diagram showing one configuration example of a physical layer of the electronic device of the embodiment.

DETAILED DESCRIPTION

Figure 2:
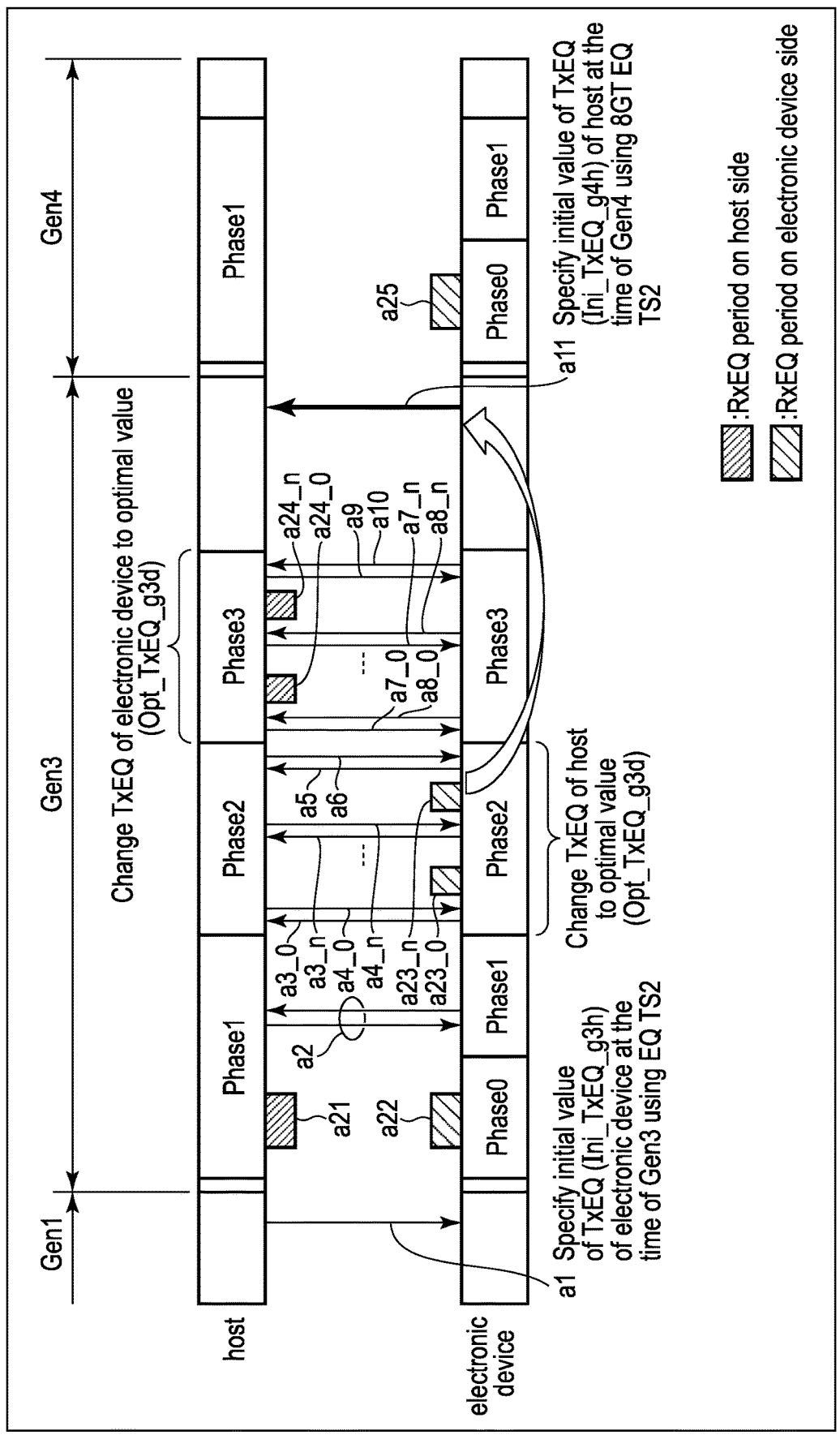
FIG. 2 is a diagram showing a flow of a link equalization sequence executed by the electronic device of the embodiment.

Embodiments will be described hereinafter with reference to the accompanying drawings.

In general, according to one embodiment, an electronic device includes a reception circuit, a transmission circuit, and a control circuit. The reception circuit receives data from a host through an interface. The transmission circuit transmits data to the host through the interface. In a first state, the control circuit determines, based on first information and second information, information on a request that includes a setting of a transmission circuit of the host to be set as an initial setting in a second state. The first state is a state of communicating with the host at a first communication speed conforming to a first specification. The second state is a state of communicating with the host at a second communication speed conforming to a second specification. The second communication speed is different from the first communication speed. The first information is information on a request of a setting of the transmission circuit of the host. The second information is information on a quality of a signal received by the reception circuit. The signal has been transmitted from the transmission circuit of the host based on the first information. The control circuit transmits the determined information from the transmission circuit to the host.

FIG. 1 is a diagram showing one configuration example of an electronic device 1 of an embodiment. FIG. 1 also illustrates one configuration example of an information processing system including the electronic device 1 and a host 2 connected to the electronic device 1.

The electronic device 1 is a device connectable to the host 2 through an interface 3. Herein, the electronic device 1 is implemented, for example, as a storage device such as a solid state drive (SSD). The host 2 is, for example, an information processing device such as a personal computer or a server. The interface 3 is, for example, a serial interface conforming to the PCIe specification.

The host 2 includes a processor 21 and a communication controller 22. The processor 21 controls each the components of the host 2, including the communication controller 22. The communication controller 22 controls communications with the electronic device 1. The communication controller 22 includes a transaction layer 41, a data link layer 42 and a physical layer 43. The physical layer 43 includes a physical (PHY) sub-block 43a and a media access control (MAC) sub-block 43b.

The interface 3 includes a link (a serial link) connected between devices. The link includes a plurality of lanes. Each of the lanes includes a differential signal line pair for transmission (Tx+, Tx−) and a differential signal line pair for reception (Rx+, Rx−).

The electronic device 1 includes a controller 11 and a nonvolatile memory 12. The controller 11 is constituted, for example, as a system-on-a-chip (SoC). The nonvolatile memory 12 is, for example, a NAND flash memory.

The controller 11 receives a command from the host 2 and executes, for example, write of data transferred from the host 2 to the nonvolatile memory 12 or read of data required by the host 2 from the nonvolatile memory. In other words, the controller 11 controls the nonvolatile memory 12 based on the command from the host 2.

The controller 11 includes a communication controller 30. The communication controller 30 controls communications with the host 2 through the interface 3. The communication controller 30 includes a transaction layer 31, a data link layer 32 and a physical layer 33. The physical layer 33 includes a physical (PHY) sub-block 33a and a media access control (MAC) sub-block 33b.

The transaction layer 31 executes construction and processing of a transaction layer packet (TLP). The TLP is a packet delivered to and from a transaction layer of a communication partner. Here, the transaction layer of the communication partner is the transaction layer 41 of the host 2.

The data link layer 32 is an intermediate layer between the transaction layer 31 and the physical layer 33. The data link layer 32 executes management of the link included in the interface 3 and construction and processing of a data link layer packet (DLLP). The DLLP is a packet delivered to and from a data link layer of a communication partner, that is, here, the data link layer 42 of the host 2.

The physical layer 33 executes an interface operation to transmit and receive data physically through a plurality of lanes included in the link. In the electronic device 1 of this embodiment, the physical layer 33 has a unique configuration (see FIG. 3). Details of this configuration will be described later.

Here, first, with reference to FIG. 2, the link equalization sequence executed at the communication speed (8 Gbps) conforming to the third generation PCIe specification (Gen3) and the communication speed (16 Gbps) conforming to the fourth generation PCIe specification (Gen4) respectively will be discussed.

The optimal output waveform of data physically transmitted and received by the physical layer 33 may vary depending on the characteristics of a transmission route built between the self and the communication partner, more specifically, a combination of three elements: a partner device, a cable (and/or wiring pattern) and an own device. Further, the optimal output waveform may be different between output waveforms of data transmitted from the partner device to the own device and output waveforms of data transmitted from the own device to the partner device. The link equalization sequence executes adjustment of these output waveforms and the adjustment of an equalizer of a receiver's side. The link equalization sequence is also referred to as training, tuning or the like. In Gen3 and Gen4, it is required that reception characteristics satisfy the bit error rate (BER)<$10^{-12}$.

The link equalization sequence is constituted by three phases of Phase 1 to Phase 3.

Phase 1: Each of the electronic device 1 and the host 2 notifies a partner device of the capability of the own device (Full Swing [FS], Low Frequency [LF]). In Phase 1, it is required that reception characteristics satisfy BER<$10^{-4}$.

Phase 2: Output waveform (TxEQ) of the host 2 is adjusted so that the reception characteristics of the electronic device 1 satisfy BER<$10^{-12}$. The TxEQ is comprised of, for example, coefficient values included in Tx Equalization Presets defined in the PCIe specification. The electronic device 1 has an initiative for Phase 2.

Phase 3: TxEQ of the electronic device 1 is adjusted so that the reception characteristics of the host 2 satisfy BER<$10^{-12}$. The host 2 has an initiative for Phase 3.

That is, to improve the BER of the own device, TxEQ of the host 2 needs to be controlled in Phase 2.

When the host 2 and the electronic device 1 start communications conforming to the Gen4, the host 2 and the electronic device 1 operate cooperatively and executes the link equalization sequence at the communication speed conforming to the first generation PCIe specification (Gen1), the communication speed conforming to the Gen3 and the communication speed conforming to the Gen4 in this order.

More specifically, first, as shown in FIG. 2, an ordered set defined as EQTS2 is transmitted at the communication speed conforming to the Gen1 from the host 2 to the electronic device 1 (a1). This specifies the initial value (Ini_TxEQ_g3d) of TxEQ of the electronic device 1 at the time of the Gen3. The ordered set is a message which can be transmitted and received between physical layers.

The host 2 executes the adjustment of the equalizer of its receiver's side to meet the reception characteristics required in Phase 1 as preparation for receiving data sent from the electronic device 1 with the specified TxEQ (Ini_TxEQ_g3d) (a21). On the other hand, the electronic device 1 executes the adjustment of the equalizer of its receiver's side to meet the reception characteristics required in Phase 1 while TxEQ of the host 2 being unknown, for example, according to the reception status of EQTS2 (a22). The adjustment of the equalizer of the receiver's side executed in the electronic device 1 while the TxEQ of the host 2 being unknown, is defined as Phase 0 as a phase to be executed prior to Phase 1. Note that a period for optimizing the reception characteristics is also referred to as an RxEQ period.

The host 2 and the electronic device 1 notify the capability thereof to the partner device each other in Phase 1 (a2).

When Phase 1 is completed, Phase 2 is executed with an initiative of the electronic device 1. The electronic device 1 requests the host 2 to apply 0-th to n-th TxEQs 2 sequentially (a3_0 to a3_n). The numeral n is, for example, nine. Upon applying the TxEQ requested from the electronic device 1, the host 2 transmits an ordered set to notify the TxEQ to the electronic device 1 (a4_0 to a4_n). With the ordered set, the electronic device 1 can confirm that the requested TxEQ has been applied in the host 2. The electronic device 1 adjusts the equalizer of its receiver's side (a23_0 to a23_n), checks a TxEQ which can achieve the highest signal quality (referred to as Opt_TxEQ_g3h) out of the 0-th to n-th TxEQs, and requests the host 2 to apply the TxEQ (Opt_TxEQ_g3h) (a5). The electronic device 1 stores the ordered set (a6) transmitted from the host 2 in reply to this request. This ordered set indicates the TxEQ (Opt_TxEQ_g3h).

Phase 3, which follows Phase 2, is executed with an initiative of the host 2. The host 2 requests the electronic device 1 to apply 0-th to n-th TxEQs sequentially (a7_0 to a7_n). The numeral n is, for example, nine. Upon applying the TxEQ requested by the host 2, the electronic device 1 transmits an ordered set to notify the TxEQ to the host 2 (a8_0 to a8_n). The host 2 adjust the equalizer of its receiver's side (a24_0 to a24_n), checks the TxEQ (Opt_TxEQ_g3d) which can achieve the highest signal quality out of the 0-th to n-th TxEQs, and requests the electronic device 1 to apply the TxEQ (Opt_TxEQ_g3d) (a9). Upon applying this TxEQ, the electronic device 1 transmits an ordered set to notify the host 2 of the TxEQ (a10). Thus, the link equalization sequence in the communication speed conforming to the Gen3 is completed.

When the link equalization sequence in the Gen3 is completed, the host 2 and the electronic device 1 execute the link equalization sequence at the communication speed conforming to the Gen4 in cooperation with each other. Phase 1 to Phase 3 in this link equalization sequence of the Gen4 are also executed basically in a manner similar to that of the Gen3.

Note that the host 2 can determine whether the execution of Phase 2 and Phase 3 is necessary or not, out of Phase 1 to Phase 3 in the link equalization sequence of the Gen4. In other words, the host 2 can determine to omit Phase 2 or Phase 3. Even if Phase 2 or Phase 3 is omitted, the electronic device 1 is required to satisfy the reception characteristics required in the Gen4, that is, BER<$10^{-12}$.

Further, in the link equalization sequence of the Gen3 before shifting to the link equalization sequence of the Gen4, it is permitted to transmit an ordered set defined as 8 GT EQT S2 from the electronic device 1 to the host 2. The 8 GT EQT S2 is used to specify an initial value of TxEQ (referred to as Ini_TxEQ_g4h) of the host in the link equalization sequence of the Gen4. Generally, the value of the 8 GT EQ TS2 is stored as a fixed value in, for example, a register of the electronic device 1.

When Phase 2 or Phase 3 is not executed, it is necessary that the reception characteristics of the electronic device 1 satisfy BER<$10^{-12}$ in an RxEQ period of Phase 0. However, if the initial value of TxEQ (Ini_TxEQ_g4h) of the host 2 is not appropriate, the reception characteristics BER<$10^{-12}$, can not be satisfied. For this reason, in the electronic device 1 of this embodiment, the initial value of TxEQ (Ini_TxEQ_g4h) of the host 2 of the Gen4 is determined by using the result of Phase 2 of the link equalization sequence of the Gen3.

Specifically, the electronic device 1 determines the initial value of TxEQ (Ini_TxEQ_g4h) of the host 2 for the Gen4 based on the TxEQ (Opt_TxEQ_g3h) of the host 2 determined in the Gen3 and an evaluation value (referred to as an RxEQ code value) regarding the signal quality of the data transmitted with the TxEQ. The RxEQ code value includes Rx continuous time linear equalizer (CTLE) and decision feedback equalizer (DFE) settings.

If, for example, Phase 2 and Phase 3 of the link equalization sequence of the Gen3 are not executed, the electronic device 1 may determine the initial value of TxEQ (Ini_TxEQ_g4h) of the host 2 of the Gen4 by using the result of Phase 0 of the link equalization sequence of the Gen3, as well.

The electronic device 1 specifies the determined initial value of TxEQ (Ini_TxEQ_g4h) of the host 2 by using the 8 GT EQ TS2 (a11). Further, the electronic device 1 executes the adjustment of the equalizer of its receiver's side to meet the reception characteristics required in Phase 1 as preparation for receiving data transmitted from the host 2 with the specified TxEQ (a25).

FIG. 3 is a diagram showing one configuration example of the physical layer 33 of the electronic device 1 of this embodiment.

The physical layer 33 comprises an RxEQ circuit 51, an RxEQ controller 52, a clock data recovery (CDR) circuit 53, a serial-in/parallel-out (SIPO) circuit 54 and a block aligner 55. These are included in the PHY sub-block 33a. The RxEQ circuit 51 includes an equalizer 511.

Further, the physical layer 33 comprises an ordered set (OS) detector 56, a host TxEQ detector (for Gen3) 57, a host TxEQ controller (for Gen4) 58, an OS generator 59. These are included in the MAC sub-block 33b.

The physical layer 33 of the electronic device 1 of this embodiment has a unique configuration (e.g., the host TxEQ detector (for Gen3) 57, the host TxEQ controller (for Gen4) 58) to use the result of Phase 2 of the link equalization sequence in the Gen3 for the link equalization sequence in the Gen4.

The RxEQ circuit 51 is a circuit which receives signals through a differential signal line pair for reception (Rx+, Rx−).

The RxEQ controller 52 controls the equalizer 511 included in the RxEQ circuit 51. The RxEQ controller 52 outputs an RxEQ code value (Gen3) to the host TxEQ controller (for Gen4) 58. The RxEQ code value (Gen3) indicates the setting of the equalizer 511 that can optimize the quality of the signals received by the RxEQ circuit 51 in the Gen3.

The CDR circuit 53 converts the signal received by the RxEQ circuit 51 from an analog signal into a digital signal. More specifically, the CDR circuit 53 generates a clock from the received signal, and determines 0 or 1 of the received signal at cycles of the generated clock.

The SIPO circuit 54 converts serial data output from the CDR circuit 53 into parallel data.

The block aligner 55 shapes the data output from the SIPO circuit 54 into data of a certain size such as 128 bits or 130 bits.

The OS detector 56 detects an ordered set from the data shaped by the block aligner 55. Upon detecting an ordered set, the OS detector 56 outputs symbol data indicating its type.

Based on the symbol data output from the OS detector 56, the host TxEQ detector (for Gen3) 57 detects an ordered set with which the host 2 notifies the TxEQ. The host TxEQ detector (for Gen3) 57 maintains the TxEQ (referred to as Host TxEQ value) indicated by the ordered set (a4_0 to a4_n in FIG. 2) transmitted by the host 2 that has been requested to apply the TxEQ in Phase 2 of the link equalization sequence in the Gen3. The host TxEQ detector (for Gen3) 57 stores the Host TxEQ value in a register and/or an internal memory (not shown). When Phase 2 of the link equalization sequence of the Gen3 is completed, Opt_TxEQ_g3h is stored as the Host TxEQ value in the host TxEQ detector (for Gen3) 57.

The host TxEQ controller (for Gen4) 58 determines an initial value of TxEQ (Ini_TxEQ_g4h) of the host 2 for the Gen4. The host TxEQ controller (for Gen4) 58 acquires the Host TxEQ value (Opt_TxEQ_g3h) from the host TxEQ detector (for Gen3) 57 (b1), and acquires the RxEQ code value (Gen3) from the RxEQ controller 52 (b2).

The host TxEQ controller (for Gen4) 58 maintains a table to obtain the initial value of TxEQ (Ini_TxEQ_g4h) of the host 2 for Gen4 from the Host TxEQ value (Opt_TxEQ_g3h) and the RxEQ code value (Gen3) at the time of Gen3, for example. The host TxEQ controller (for Gen4) 58 maintains the table in, for example, a register and/or an internal memory (not shown).

The OS generator 59 generates an order set (specifically, 8 GT EQ TS2) to specify the initial value (Ini_TxEQ_g4h) of TxEQ of the host 2 for the Gen4 determined by the host TxEQ controller (for Gen4) 58. As the 8 GT EQ TS2 is transmitted to the host 2, the initial value (Ini_TxEQ_g4h) of TxEQ for the Gen4 is applied to the host 2.

In the electronic device 1 of this embodiment, the initial value (Ini_TxEQ_g4h) of TxEQ of the host 2 for Gen4 is not a fixed value, but is determined based on the result of Phase 2 of the link equalization sequence in the Gen3. Therefore, in the electronic device 1 of this embodiment, even if Phase 2 and Phase 3 of the link equalization sequence in the Gen4 are omitted, the possibility to satisfy the reception characteristics BER<$10^{-12}$, which is required by the Gen4, can be raised.

Thus, under such a situation that the electronic device 1 of this embodiment can be connected to various types of host devices, the initial value (Ini_TxEQ_g4h) of TxEQ of the host 2 for the Gen4 can be specified so as to satisfy the reception characteristics BER<$10^{-12}$, which is required by the Gen4.

Further, in the electronic device 1 of this embodiment, chances are high that an optimal TxEQ has already been applied in the host 2 when starting Phase 2 of the link equalization sequence in the Gen4. Therefore, when Phase 2 and Phase 3 of the link equalization sequence in the Gen4 are executed, the RxEQ period of the electronic device 1 in Phase 2 can be shortened.

Figure 4:
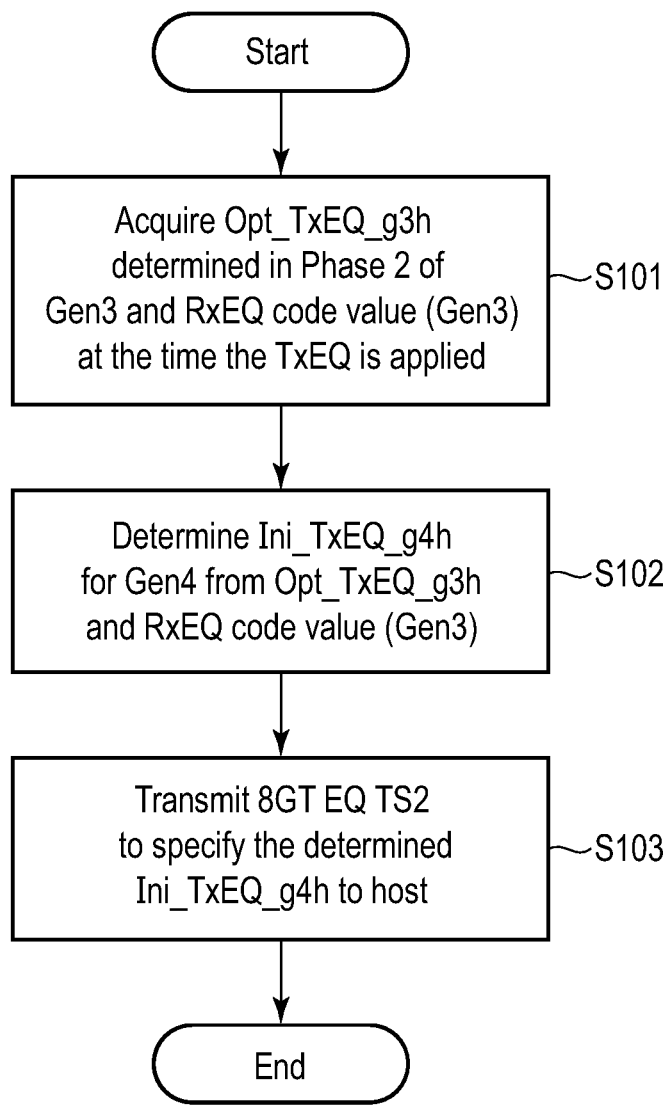
FIG. 4 is a flowchart showing steps of a process of specifying an initial value of TxEQ of the host for Gen4, which is executed by the electronic device of the embodiment.

FIG. 4 is a flowchart showing steps of the process of specifying the initial value of TxEQ (Ini_TxEQ_g4h) of the host 2 for the Gen4, executed by the electronic device 1 of this embodiment.

First, the electronic device 1 acquires TxEQ (Opt_TxEQ_g3h) of the host 2 determined in Phase 2 of the link equalization sequence in the Gen3 and the RxEQ code value (Gen3) at the time the TxEQ is applied (S101).

Then, the electronic device 1 determines an initial value (Ini_TxEQ_g4h) of TxEQ of the host 2 for the Gen4 from the TxEQ (Opt_TxEQ_g3h) of the host 2 and the RxEQ code value (Gen3) thus acquired (S102).

Then, the electronic device 1 transmits the data set (8 GT EQ TS2) to specify the determined initial value (Ini_TxEQ_g4h) of TxEQ of the host 2, to the host 2 (S103).

As described above, in the electronic device 1 of this embodiment, even if Phase 2 and Phase 3 of the link equalization sequence in the Gen4 are omitted, the possibility to satisfy the reception characteristics BER<$10^{-12}$, which is required by the Gen4, can be raised. Further, if Phase 2 and Phase 3 of the link equalization sequence in the Gen4 are executed, a time required for Phase 2 can be shortened.

That is, the electronic device 1 of this embodiment can maintain the signal quality required in the specification of the interface.

Note that, the above-provided descriptions are directed to an example of shifting from the third generation PCIe specification to the fourth generation PCIe specification, but the shift is not limited to this. For example, the electronic device 1 and the control method of this embodiment are applicable to the case of shifting from the fourth generation PCIe specification to a communication speed conforming to a future-generation PCIe specification which follow the fourth generation. Further, to a specification of interfaces other than the PCIe specification as well, the electronic device 1 of this embodiment and the control method thereof are applicable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device, comprising:
a reception circuit configured to receive data from a host through an interface;
a transmission circuit configured to transmit data to the host through the interface; and
a control circuit configured to:
execute a link equalization sequence between the host and the electronic device at a first communication speed and a second communication speed, the first communication speed conforming to a first specification, the second communication speed being different from the first communication speed and conforming to a second specification, the link equalization sequence including at least a first phase and a second phase, the first phase being a part of the link equalization sequence in which the control circuit adjusts a setting of the reception circuit without requesting the host to adjust a setting of a transmission circuit of the host, the second phase being another part of the link equalization sequence in which the control circuit adjusts the setting of the reception circuit while requesting the host to adjust the setting of the transmission circuit of the host,
in a first state in which the second phase of the link equalization sequence at the first communication speed is executed, determine, based on first information and second information, information on a first request that includes the setting of the transmission circuit of the host to be set as an initial setting in a second state in which the first phase of the link equalization sequence at the second communication speed is executed,
the first information including information on a second request of the setting of the transmission circuit of the host,
the second information including information on a quality of a signal received by the reception circuit, the signal having been transmitted from the transmission circuit of the host based on the first information; and
transmit the determined information from the transmission circuit to the host.

2. The electronic device of claim 1, wherein the control circuit is further configured to execute the determination when a state of the reception circuit shifts from the first state to the second state.

3. The electronic device of claim 1, wherein:
the first specification is a third generation PCI Express specification; and
the second specification is a fourth generation PCI Express specification.

4. The electronic device of claim 3, wherein the transmission circuit is further configured to transmit the determined information by using an ordered set of 8 GT EQ TS2.

5. The electronic device of claim 4, wherein the transmission circuit is further configured to transmit the determined information in the first state.

6. The electronic device of claim 4, wherein:
the first information includes a TxEQ value at the transmission circuit of the host determined during the link equalization sequence in the third generation PCI Express specification; and
the second information includes an RxEQ code value on a quality of the signal received by the reception circuit.

7. The electronic device of claim 1, wherein the control circuit is further configured to determine the information by:
requesting a plurality of the settings of the transmission circuit of the host;
selecting, for each of the plurality of the settings of the transmission circuit of the host, one of a plurality of the settings of the reception circuit; and
determining a combination of one of the settings of the transmission circuit of the host and one of the settings of the reception circuit that achieves a best quality of the signal among combinations of the plurality of the settings of the transmission circuit of the host and the plurality of the settings of the reception circuit.

8. The electronic device of claim 1, wherein the electronic device is a storage device.

9. An information processing system, comprising:
a storage device;
a host configured to communicate with the storage device; and
an interface connecting the storage device and the host, wherein the storage device includes:
a reception circuit configured to receive data from the host through the interface;
a transmission circuit configured to transmit to the host through the interface; and
a control circuit configured to:
execute a link equalization sequence between the host and the storage device at a first communication speed and a second communication speed, the first communication speed conforming to a first specification, the second communication speed being different from the first communication speed and conforming to a second specification, the link equalization sequence including at least a first phase and a second phase, the first phase being a part of the link equalization sequence in which the control circuit adjusts a setting of the reception circuit without requesting the host to adjust a setting of a transmission circuit of the host, the second phase being another part of the link equalization sequence in which the control circuit adjusts the setting of the reception circuit while requesting the host to adjust the setting of the transmission circuit of the host, in a first state in which the second phase of the link equalization sequence at the first communication speed is executed, determine, based on first information and second information, information on a first request that includes the setting of the transmission circuit of the host to be set as an initial setting in a second state in which the first phase of the link equalization sequence at the second communication speed is executed, the first information including information on a second request of the setting of the transmission circuit of the host, the second information including information on a quality of a signal received by the reception circuit, the signal having been transmitted from the transmission circuit of the host based on the first information; and transmit the determined information from the transmission circuit to the host.

10. A method of shifting a storage device including a reception circuit and a transmission circuit from a first state to a second state, the reception circuit configured to receive data from a host through an interface, the transmission circuit configured to transmit data to the host through the interface, the method comprising:

executing a link equalization sequence between the host and the storage device at a first communication speed and a second communication speed, the first communication speed conforming to a first specification, the second communication speed being different from the first communication speed and conforming to a second specification, the link equalization sequence including at least a first phase and a second phase, the first phase being a part of the link equalization sequence in which a setting of the reception circuit is adjusted without requesting the host to adjust a setting of a transmission circuit of the host, the second phase being another part of the link equalization sequence in which the setting of the reception circuit is adjusted while requesting the host to adjust the setting of the transmission circuit of the host in the first state in which the second phase of the link equalization sequence at the first communication speed is executed, determining, based on first information and second information, information on a first request that includes the setting of the transmission circuit of the host to be set as an initial setting in the second state in which the first phase of the link equalization sequence at the second communication speed is executed, the first information including information on a second request of the setting of the transmission circuit of the host, the second information including information on a quality of a signal received by the reception circuit, the signal having been transmitted from the transmission circuit of the host based on the first information and; and transmitting the determined information from the transmission circuit to the host.

11. The method of claim 10, wherein the determining step is executed when a state of the reception circuit shifts from the first state to the second state.

12. The method of claim 10, wherein:
the first specification is a third generation PCI Express specification; and
the second specification is a fourth generation PCI Express specification.

13. The method of claim 12, wherein the transmitting step comprises transmitting the determined information by using an ordered set of 8 GT EQ TS2.

14. The method of claim 13, wherein the transmitting step comprises transmitting the determined information in the first state.

15. The method of claim 13, wherein:
the first information includes a TxEQ value at the transmission circuit of the host determined during the link equalization sequence in the third generation PCI Express specification; and
the second information includes an RxEQ code value on a quality of the signal received by the reception circuit.

16. The method of claim 10, wherein the determining step further includes:
requesting a plurality of the settings of the transmission circuit of the host;
selecting, for each of the plurality of the settings of the transmission circuit of the host, a plurality of settings of the reception circuit; and
determining a combination of one of the settings of the transmission circuit of the host and one of the settings of the reception circuit that achieves a best quality of the signal among combinations of the plurality of the settings of the transmission circuit of the host and the plurality of the settings of the reception circuit.

17. The method of claim 10, wherein the storage device further includes a controller and the determining step is executed by the controller.

18. The method of claim 10, wherein the storage device and the host are connected via the interface.

* * * * *